(12) United States Patent
Iwamura et al.

(10) Patent No.: US 9,084,182 B2
(45) Date of Patent: Jul. 14, 2015

(54) METHOD OF BARRING NETWORK ACCESS IN MOBILE DEVICE, MOBILE DEVICE, AND PROCESSOR USED IN MOBILE DEVICE

(75) Inventors: Mikio Iwamura, Tokyo (JP); Minami Ishii, Tokyo (JP); Mutsumi Ishimoto, Tokyo (JP)

(73) Assignee: NIT DOCOMO, INC., Tokyo (JP)

( * ) Notice: Subject to any disclaimer, the term of this patent is extended or adjusted under 35 U.S.C. 154(b) by 100 days.

(21) Appl. No.: 13/985,853

(22) PCT Filed: Dec. 20, 2011

(86) PCT No.: PCT/JP2011/079451
§ 371 (c)(1),
(2), (4) Date: Aug. 15, 2013

(87) PCT Pub. No.: WO2012/114630
PCT Pub. Date: Aug. 30, 2012

(65) Prior Publication Data
US 2013/0324118 A1 Dec. 5, 2013

(30) Foreign Application Priority Data
Feb. 21, 2011 (JP) .................................. 2011-035111

(51) Int. Cl.
*H04W 48/16* (2009.01)
*H04W 48/02* (2009.01)

(52) U.S. Cl.
CPC .............. *H04W 48/16* (2013.01); *H04W 48/02* (2013.01)

(58) Field of Classification Search
None
See application file for complete search history.

(56) References Cited

U.S. PATENT DOCUMENTS

2011/0201307 A1* 8/2011 Segura .......................... 455/411
2011/0274040 A1* 11/2011 Pani et al. ..................... 370/328
2012/0039171 A1* 2/2012 Yamada et al. ............... 370/232

OTHER PUBLICATIONS

3GPP TS 36.331 V10.0.0, dated Dec. 2010, p. 36-40, 140, 141.*
QoS in LTE PSCR Demo Days by Wim Brouwer, dated Dec. 2010.*
International Search Report for corresponding International Application No. PCT/JP2011/079451, mailed Mar. 27, 2012 (3 pages).
Written Opinion for corresponding International Application No. PCT/JP2011/079451, mailed Mar. 27, 2012 (3 pages).
NTT DOCOMO, Inc., "AC-Barring for Mobile Originating CSFB calls"; 3GPP TSG-RAN2 Meeting #70bis, R2-103867; Stockholm, Sweden, Jun. 28-Jul. 2, 2010 (12 pages).
3GPP TS 36.331 V9.5.0; "3rd Generation Partnership Project; Technical Specification Group Radio Access Network; Evolved Universal Terrestrial Radio Access (E-UTRA); Radio Resource Control (RRC); Protocol specification (Release 9)"; Dec. 2010 (252 pages).
3GPP TS 25.321 V9.5.0; "3rd Generation Partnership Project; Technical Specification Group Radio Access Network; Medium Access Control (MAC) protocol specification (Release 9)"; Dec. 2010 (194 pages).
3GPP TS 25.331 V9.5.0; "3rd Generation Partnership Project; Technical Specification Group Radio Access Network; Radio Resource Control (RRC); Protocol specification (Release 9)"; Dec. 2010 (1796 pages).

\* cited by examiner

*Primary Examiner* — Daniel Lai
(74) *Attorney, Agent, or Firm* — Osha Liang LLP

(57) ABSTRACT

When a network is in a state of requiring some sort of access barring, a reference value notified to a mobile device is determined to indicate a value in which an access of a certain mobile device is denied while an access of another mobile device is allowed. When an own device has a special type access class, it is determined that an access is allowed The appropriateness of an access is determined according to designation from the network when the own device has the special type access class, and when the own device does not have the special type access class, it is determined that an access is denied.

20 Claims, 10 Drawing Sheets

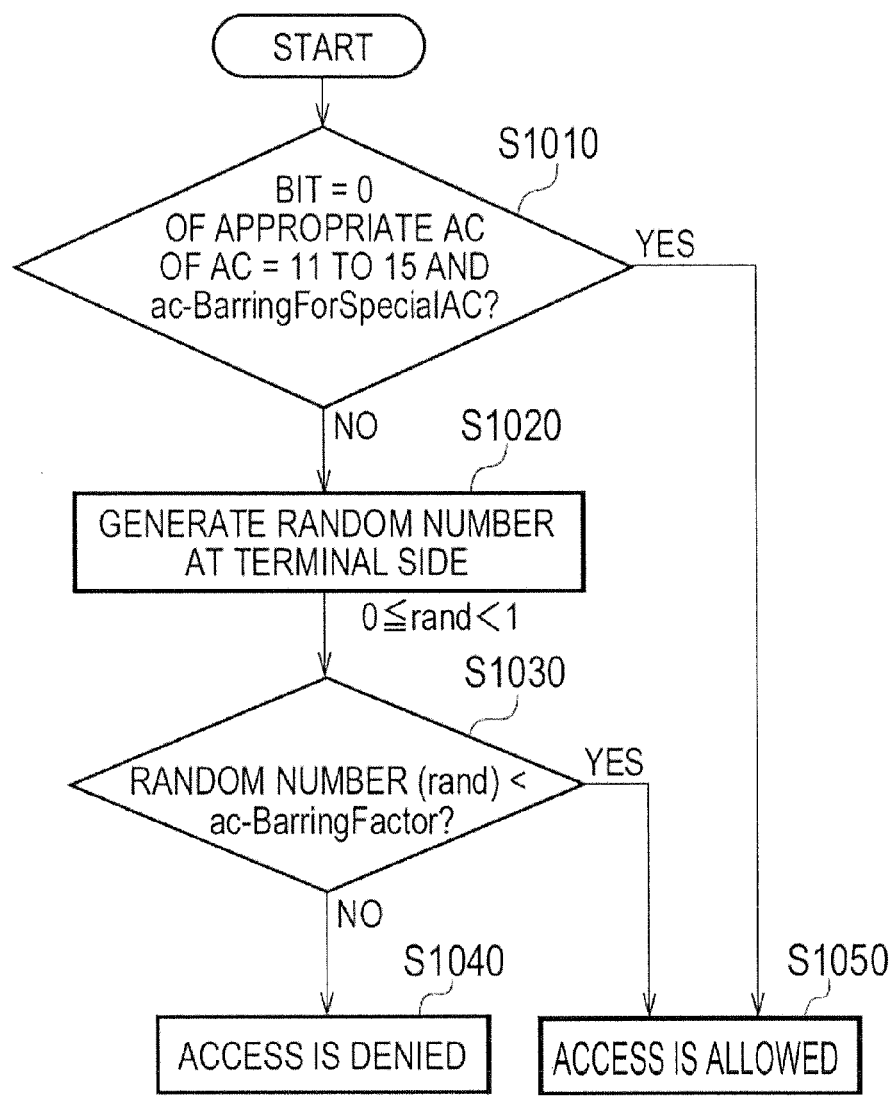

METHOD OF BARRING NETWORK ACCESS IN MOBILE DEVICE, MOBILE DEVICE, AND PROCESSOR USED IN MOBILE DEVICE

TECHNICAL FIELD

The present invention relates to a technology to bar an access to a network from a mobile device connectable to a radio access network.

BACKGROUND ART

In a W-CDMA network that is a typical representative radio access system, two-stage access barring is performed as illustrated in FIG. 7. A protocol architecture of a radio interface in the W-CDMA is configured from a physical layer (L1), a data link layer (L2), and a network layer (L3). When a mobile device accesses the network, first, whether an access to a cell in the L3 layer of the mobile device is allowed is determined. If allowed, next, whether use of a random access channel (RACH) is allowed in the L2 layer of the mobile device is determined.

The allowance of an access to a cell means, to be more specific, start of a setting procedure of radio resource control (RRC) connection, and the allowance of use of a RACH means, to be more specific, start of a physical RACH (PRACH) transmission procedure in the L1 layer is allowed.

The access barring in the L3 layer in the W-CDMA (see Non-Patent Literature 1) is typically performed such that a radio network control device (RNC) writes barring information in a system information block (SIB) to be notified to a mobile device in accordance with the degree of congestion of the network that the radio network control device itself controls. To be specific, whether an access is allowed (0) or an access is denied (1) with respect to each AC is described in a part called an SIB type 3 (SIB3) as an access class (AC) barring status.

Here, the access class includes normal type ACs (AC=0 to 9) and special type ACs (AC=11 to 15). As the special type AC, for example, AC=11 is allocated to a mobile device for network operators, AC=12 is allocated to a mobile device for police services, AC=13 is allocated to a mobile device for use by government, and AC=14 is allocated to a mobile device for emergency services. The normal type AC may be additionally allocated to the mobile device to which the special type AC is allocated.

Therefore, typically, an AC barring status in which accesses of all of the special type ACs are allowed (0), accesses of a part of the normal type ACs are allowed (0), and accesses of the rest are denied (1) is described in the SIB3. If there are 10 normal type ACs, the percentage of the mobile device, an access of which is barred, can be changed at 10% intervals.

For example, as illustrated in FIG. 8, accesses of nine ACs being allowed (0) and an access of one AC being denied (1) are designated if it is desired to bar 10%, while accesses of seven ACs being allowed (0) and accesses of three ACs being denied (1) are designated if it is desired to bar 30%. At this time, keeping an access of the same AC denied for a long time is problematic from the standpoint of fairness of communication service. Therefore, the AC, an access of which is denied, is circulated among AC=0 to 9 with time.

The mobile device refers to the barring status corresponding to an AC to which the own device belongs from among the most recently notified SIB3 before starting a setting procedure of the RRC connection, and does not start the setting procedure when an access being denied (1) is designated.

When an access being allowed (0) is designated, the mobile device starts the setting procedure, and proceeds in control in the L2 layer described below, accordingly.

The access barring in the L2 layer in the W-CDMA (see Non-Patent Literature 2) is such that, first, information indicating a mapping of the access class (AC) and an access service class (ASC) is described in an SIB type 5 (SIB5), as illustrated in FIG. 7, and is notified to the mobile device.

For example, it is possible to correspond most preferential ACs (for example, AC=12 and 14) from among the special type ACs to ASC=0, the rest of the special type ACs (for example, AC=11 and 13) to ASC=1, and the normal type ACs (AC=0 to 9) to ASC=2. As a simple example, when the ASC has two types of 0 and 1, preferential ACs (for example, AC=12 and 14) from among the special type ACs are made corresponding to ASC=0, and the rest of the special type ACs and the normal type ACs (for example, AC=0 to 9, 11, 13, and 15) are made corresponding to ASC=1.

Then, a persistence value ($P_i$) that determines how much percentage of mobile device can use the RACH in each ASC (i) corresponding to the AC is determined based on a persistence level (N) described in an SIB type 7 (SIB7) and is notified. N is a natural number of 1 to 8, and $P(N)=2^{-(N-1)}$ is determined. $P_0$ of ASC=0 is 1, $P_1$ of ASC=1 is P(N), $P_2$ of ASC=2 is $s_2 P(N)$ ($s_i$ is a number from 0 to 1, and is notified with the SIB5).

FIG. 9 illustrates an operation of a mobile device in examples where the ASC has two types of 0 and 1. First, the mobile device checks which ASC the AC corresponds to from the mapping, where the own device belongs to the AC (S910), obtains the persistence value P(N) using N if ASC=1 (S920), and sets P=1 if ASC=0 (S930). For example, P(N)=½ if N=2, and P(N)=¼ if N=3.

Then, the mobile device generates a random number in a range of 0 to 1 (S940), and compares the random number with P(N) (S950). The mobile device determines an access is denied if the random number is larger than P(N) (S960), and determines an access is allowed if the random number is smaller than P(N) (S970). In a case where P=1 is set, when the random number is compared with P, it is always determined that an access is allowed (the dotted-line arrow in the drawing). The mobile device interprets the RACH can be used when having determined that an access is allowed, and starts a PRACH transmission procedure.

With the above-described control, 100% of the mobile devices having ASC=0, 25% of the mobile devices having ASC=1 in the example of N=3, and 12.5% of the mobile devices having ASC=2 where $s_2$=0.5 can access the network using the RACH. A value of N that is the basis for determining the percentage is typically determined by a radio base station (NodeB) that performs measurement of a load in a cell of the own station, and is described in the SIB7.

As described above, in the network of W-CDMA, the congestion of the network has been overcome by a mechanism in which the L3 layer and the L2 layer perform two-stage access barring. However, in the network of a next-gen long term evolution (LTE) system, the mechanism is integrated into access barring in the L3 layer.

Note that the access barring in the L3 layer in the W-CDMA circulates the AC to be barred with time, as illustrated in FIG. 8. Therefore, it is necessary to periodically change the AC barring status notified with the SIB3. In a case where the AC barring status is changed in every several tens of seconds in order to maintain the fairness of communication service, for example, when a paging message that indicates the change of the content of the SIB3 is repeatedly transmitted during a predetermined period so that the change is passed on to all of the mobile devices, it soon gets to a next change point, and there is a high possibility of almost steadily transmitting the paging message. If so, there is a problem that a mobile device that needs to almost steadily receive the paging message may burn battery power.

To solve this problem, in the access barring in the L3 layer in the LTE (see Non-Patent Literature 3), the appropriateness of an access is determined by comparison with a random number generated by the mobile device by following the access barring in the L2 layer in the W-CDMA.

This is because, when it is desired to bar 30%, for example, if a value indicating "70%" is notified at the beginning of a barring period, the mobile device then compares the value and a random number, so that it is determined that an access is allowed by the probability of 70% (70% from among the mobile devices in the cell), and it is determined that an access is denied by the probability of 30% (30% from among the mobile device in the cell), whereby frequent change of the notification information becomes unnecessary. Note that, for this purpose, the LTE notifies information for designating values at 5% intervals from 0 to 95% instead of notifying the persistence level (N) like the W-CDMA.

In following the mechanism of the access barring in the L2 layer in the W-CDMA in this way, a mechanism in which an access is always allowed if ASC=0 and the appropriateness of an access is determined according to the comparison with a random number if ASC=1 is introduced as it is. Therefore, in the LTE system, the operation illustrated in FIG. 10 is performed in the mobile device.

In the access barring of the LTE, whether each AC corresponds to ASC=0, in which the AC is not subject to barring, or to ASC=1, in which the AC is subject to barring, is notified as information of ac-BarringForSpecialAC. Note that the normal type ACs (AC=0 to 9) cannot correspond to ASC=0, and therefore, notified information is information regarding special type ACs (AC=11 to 15).

That is, in the LTE system, information of designating no barring (0) for preferential ACs (for example AC=12 and 14) from among the special type ACs, and of designating barring (1) for the rest of the special type ACs and the normal type ACs (for example, AC=0 to 9, 11, 13, and 15) is notified.

Further, in the access barring of the LTE, the mobile device having an AC subject to barring notifies information of ac-BarringFactor as information for designating values to be compared with a random number (values at 5% intervals from 0 to 95%).

The mobile device that has received the information then proceeds to Yes at S1010 and determines accesses of the ACs among the special type ACs, in which 0 is designated (for example, AC=12 and 14), are allowed (S1050), and proceeds to No at S1010 and generates random numbers of the ACs from among the special type ACs, in which 1 is designated, and the normal type ACs (for example, AC=0 to 9, 11, 13, and 15) (S1020) by the ac-BarringForSpecialAC, as illustrated in FIG. 10. If the generated random number is smaller than the value designated by the ac-BarringFactor (Yes at S1030), it is determined that an access is allowed (S1050), and if the generated random number is larger than the value designated by the ac-BarringFactor (No at S1030), it is determined that an access is denied (S1040).

CITATION LIST

Non-Patent Literature

Non-Patent Literature 1: 3GPP TS25.331
Non-Patent Literature 2: 3GPP TS25.321
Non-Patent Literature 3: 3GPP T536.331

SUMMARY OF INVENTION

Technical Problem

The above-described network access barring in the LTE system, an AC from among the special type ACs, in which 1 is designated, and the normal type AC are subject to barring according to the comparison with a random number at the completely same rate.

However, originally, the special type AC is provided as an AC to be always preferentially handled compared with the normal type AC. That is, in the W-CDMA, first, an access of the special type AC is always allowed in the L3 layer, and an access of the normal type AC may be allowed and denied in a manner to periodically change the AC, an access of which is allowed.

Then, in the W-CDMA, the access barring in the L2 layer is performed after going through the difference in handling in the above-described L3 layer. Therefore, in the mechanism in which an access is always allowed if ASC=0 and the appropriateness of an access is determined by comparison with a random number if ASC=1, if a preferential AC from among the special type ACs is made corresponding to ASC=0 and the rest of the special type ACs and the normal type AC are made corresponding to ASC=1, the rest ACs other than the preferential AC from among the special type ACs are always preferentially handled compared with the normal type AC.

That is, in the W-CDMA, while the rest ACs other than the preferential AC from among the special type ACs proceed to the processing of L2 layer without being subject to the access barring in the L3 layer (with being handled such that accesses are always allowed), similarly to the preferential AC, the normal type ACs are subject to the barring in which accesses thereof are periodically denied in the L3 layer, and only the AC, an access of which has been allowed, proceeds to the processing of the L2 layer. Therefore, even if the AC is subject to the barring in the L2 layer at the same rate where ASC=1, the special type AC gets preference over the normal type AC in the L3 layer. Therefore, any of the special type ACs is always preferentially handled compared with the normal type AC.

Furthermore, in an actual operation of the network, if the access barring is provided in the L3 layer in accordance with the congestion state of the network, a shortage of the resource of the RACH in the L2 layer is less likely to happen, and therefore even if the same barring is provided in the L2 layer, there is a profound effect of the preference if preference is given in the L3 layer.

Further, in the W-CDMA, a difference in handling can be provided in the L2 layer, in which a particularly preferential AC from among the special type ACs is made corresponding to ASC=0, the rest of the special type ACs is made corresponding to ASC=1, and the normal type ACs are made corresponding to ASC=2.

As described above, while the original purpose is realized in the access barring in the W-CDMA, in which the special type AC is always preferentially handled compared with the normal type AC, the LTE system has followed the mechanism of the access barring in the L2 layer in the W-CDMA as it is when being integrated into the access barring in the L3 layer, and therefore, the AC subject to barring from among the special type ACs and the normal type AC are subject to completely the same barring, and a problem of losing the original purpose of the special type AC is caused.

An objective of the present invention is to realize network access barring in which the original purpose of the special type access class can be realized in a mobile device connected to an LTE system network in view of the foregoing.

Further, the network access barring is typically realized by determining the appropriateness of an access by a mobile device using information notified from the radio access network. For example, even in a case where wrong information is notified due to malfunction of the network or information is notified in a different operation by a roaming destination network, it is desirable to realize the access barring in which a mobile device having a special type access class is always preferentially handled by a proper operation by the mobile device itself, and realization of such a mobile device is an objective of the present invention.

Solution to Problem

A method of barring a network access according to a principle of the present invention is performed in a mobile device connectable to a radio access network. Each mobile device connectable to the radio access network belongs to at least one access class, a special type access class and a normal type access class exist in the access class, notification information to be notified to each mobile device from the radio access network includes barring information for barring an access to the network, and the barring information includes first barring information for designating whether a mobile device in each access class is subject to access barring, and second barring information indicating a value serving as a reference for determining appropriateness of an access according to a relationship with a numerical value generated by each mobile device. The mobile device determines whether the reference indicated by the second barring information has a possibility in which an access of a certain mobile device is denied while an access of another mobile device is allowed by a numerical value generated by each mobile device when establishing connection to the radio access network; when having determined to have the possibility, determines that an access is allowed when having the special type access class as an access class to which the mobile device itself belongs, and determining appropriateness of an access according to a relationship between a numerical value generated by the mobile device itself and the value serving as the reference when not having the special type access class as an access class to which the mobile device itself belongs; and when having determined not to have the possibility, determines the appropriateness of an access according to designation by the first barring information when having the special type access class as an access class to which the mobile device itself belongs, and determining that an access is denied when not having the special type access class as an access class to which the mobile device itself belongs.

According to the above-described configuration, when the second barring information that indicates the reference value that has a possibility is notified, in which an access of a certain mobile device is denied while an access of another mobile device is allowed by the numerical value generated by each mobile device, a mobile device having the special type access class is always determined that an access is allowed regardless of the reference value, and when the second barring information that indicates the reference value that does not have the possibility is notified, a mobile device having no special type access class is always determined that an access is denied. Therefore, the mobile device having a special type access class is always preferentially handled.

Furthermore, according to the above-described configuration, when the second barring information that indicates the reference value that has a possibility is notified, in which an access of a certain mobile device is denied while an access of another mobile device is allowed by the numerical value generated by each mobile device, the mobile device having the special type access class is always determined that an access is allowed irrespective of the first barring information for designating whether an access a mobile device having each access class is allowed or denied. Therefore, the mobile device having a special type access class is always preferentially handled without being influenced by an operation or a malfunction of the radio access network.

Note that the first barring information may describe whether barring is provided with respect to only the special type access class, and in that case, it can be understood that notification of the first barring information itself designates that the normal type access class is subject to access barring.

Further, according to the above-described configuration, when the second barring information that indicates the reference value that does not have a possibility is notified, in which an access of a certain mobile device is denied while an access of another mobile device is allowed by the numerical value generated by each mobile device, a mobile device having no special type access class (a mobile device only belongs to a normal type access class) is always determined that an access is denied. Therefore, the mobile device can be operated even without referring to whether the first barring information has been received, where the normal type access class has access barring and the content thereof is an access being denied.

In the above-described configuration, it can be determined such that, when the value serving as the reference is a value determined that an access is denied regardless of the numerical value generated by the mobile device, the reference indicated by the second barring information is determined not to have the possibility in which an access of a certain mobile device is denied while an access of another mobile device is allowed by the numerical value generated by each mobile device.

Accordingly, the operation of the moving device ensures consistency, where, when the second barring information that indicates the reference value that does not have the possibility is notified, in which an access of a certain mobile device is denied while an access of another mobile device is allowed by the numerical value generated by each mobile device, a mobile device having no special type access class (a mobile device only belongs to a normal type access class) is always determined that an access is denied.

Further, in the above-described configuration, the value serving as the reference may be determined based on a percentage of mobile devices, accesses of which are desired to allow in the network, and the numerical value generated by each mobile device may be a number functioning as a random number.

As the number functioning as the random number, for example, a pseudo random number generated by a processor in each mobile device, a number obtained by applying processing to a value unique to each mobile device to be changed with time, and the like may be implemented. In short, if the probability of an access being allowed is different among the mobile devices having the same normal type access class, it will be a problem from the standpoint of fairness of communication service. Therefore, the number functioning as the random number mentioned here is a number that can be obtained such that, if it is continued to compare a number generated every time and the same reference value, the mobile devices having different probabilities of an access being allowed come to have the similar number.

In the above-described configuration, the mobile device may start the setting procedure of the RRC connection corresponding to the network in accordance with determination that an access is allowed. Accordingly, the access barring in the L3 layer becomes possible.

In the above-described configuration, the radio access network can be operated according to the LTE system.

A mobile device according to a principle of the present invention is a mobile device connectable to a radio access network, each mobile device connectable to the radio access network belonging to at least one access class, and a special type access class and a normal type access class existing in the access class. The mobile device includes: a reception means configured to receive notification information notified from the radio access network; a storage means configured to take out from the notification information and store barring information for barring an access to the network, and including first barring information for designating whether a mobile device in each access class is subject to access barring, and second barring information indicating a value serving as a reference for determining appropriateness of an access according to a relationship with a numerical value generated by each mobile device; a storing means configured to store information indicating at least one access class to which the mobile device itself belongs; a generation means configured to select one from among a plurality of available numerical values every time generation of a numerical value is instructed, and to generate a value as a numerical value at the time of instruction; and a determination means configured to determine whether the reference indicated by the second barring information has a possibility in which an access of a certain mobile device is denied while an access of another mobile device is allowed by a numerical value generated by each mobile device, when having determined to have the possibility, to determine that an access is allowed when the information of the storing means indicates the special type access class is included, and to determine appropriateness of an access according to a relationship between the numerical value generated by the generation means and the value serving as the reference when the information of the storing means indicates the special type access class is not included, and when having determined not to have the possibility, to determine the appropriateness of an access according to designation by the first barring information when the information of the storing means indicates the special type access class is included, and to determine that an access is denied when the information of the storing means indicates the special type access class is not included.

With the above-described configuration, the access barring can be realized by a mobile device in which the mobile device having a special type access class is always preferentially handled without being influenced by an operation or a malfunction of the radio access network.

In the above-described configuration, a decoding means may be further provided, which decodes the second barring information first from among the barring information stored by the storing means, and decodes the first barring information when the reference indicated by the second barring information is determined, by the determination means, not to have a possibility in which an access of a certain mobile device is denied while an access of another mobile device is allowed by the numerical value generated by each mobile device, and the information in the storing means indicates the special type access class is included.

Accordingly, a case of decoding the first barring information is limited, and a load of the decoding processing in the mobile device can be reduced. Furthermore, according to the above-described configuration, when the previously decoded second barring information indicates the reference value that does not have a possibility in which an access of a certain mobile device is denied while an access of another mobile device is allowed by the numerical value generated by each mobile device, processing of converting the decoded second barring information into a value to be actually compared with a random number can be omitted.

In the above-described configuration, the generation means may be configured to generate the numerical value when the reference indicated by the second barring information is determined, by the determination means, to have a possibility in which an access of a certain mobile device is denied while an access of another mobile device is allowed by the numerical value generated by each mobile device, and the information in the storing means indicates the special type access class is not included.

Accordingly, the case of generating a random number, and the like is limited, and the load of the generation processing in the mobile device can be reduced.

A processor according to a principle of the present invention is incorporated in and used by a mobile device. Each mobile device connectable to the radio access network belongs to at least one access class, a special type access class and a normal type access class exist in the access class, notification information to be notified to each mobile device from the radio access network includes barring information for barring an access to the network, and the barring information includes first barring information for designating whether a mobile device in each access class is subject to access barring, and second barring information indicating a value serving as a reference for determining appropriateness of an access according to a relationship with a numerical value generated by each mobile device. The processor performs operations of: determining whether the reference indicated by the second barring information has a possibility in which an access of a certain mobile device is denied while an access of another mobile device is allowed by a numerical value generated by each mobile device when establishing connection to the radio access network; when having determined to have the possibility, determining that an access is allowed when the mobile device has the special type access class as an access class to which the mobile device itself belongs, and determining appropriateness of an access according to a relationship between a numerical value generated by the mobile device itself and the value serving as the reference when the mobile device does not have the special type access class as an access class to which the mobile device itself belongs; and when having determined not to have the possibility, determining the appropriateness of the access according to designation by the first barring information when the mobile device has the special type access class as an access class to which the mobile device itself belongs, and determining that the access is denied when the mobile device does not have the special type access class as an access class to which the mobile device itself belongs.

With the above-described configuration, the access barring can be realized by a processor to be mounted on a mobile device in which the mobile device having a special type access class is always preferentially handled without being influenced by an operation or a malfunction of the radio access network. The processor may be incorporated in the interior of the mobile device as a semiconductor chip.

Note that each invention of the above-described method of barring a network access can be established as an invention of a mobile device and an invention of a processor used in a mobile device. Further, each invention of the above-described mobile device can be established as an invention of a method of barring a network access and an invention of a processor used in a mobile device.

Advantageous Effects of Invention

As described above, according to the present invention, access barring can be realized in a mobile device, in which a mobile device having a special type access class is always preferentially handled without depending on an operation of a radio access network connected thereto.

BRIEF DESCRIPTION OF DRAWINGS

FIG. 10 is a flowchart describing an existing access barring method in the LTE system.

DESCRIPTION OF EMBODIMENTS

Hereinafter, embodiments of the present invention will be described with reference to FIGS. 1 to 6.

Figure 1:
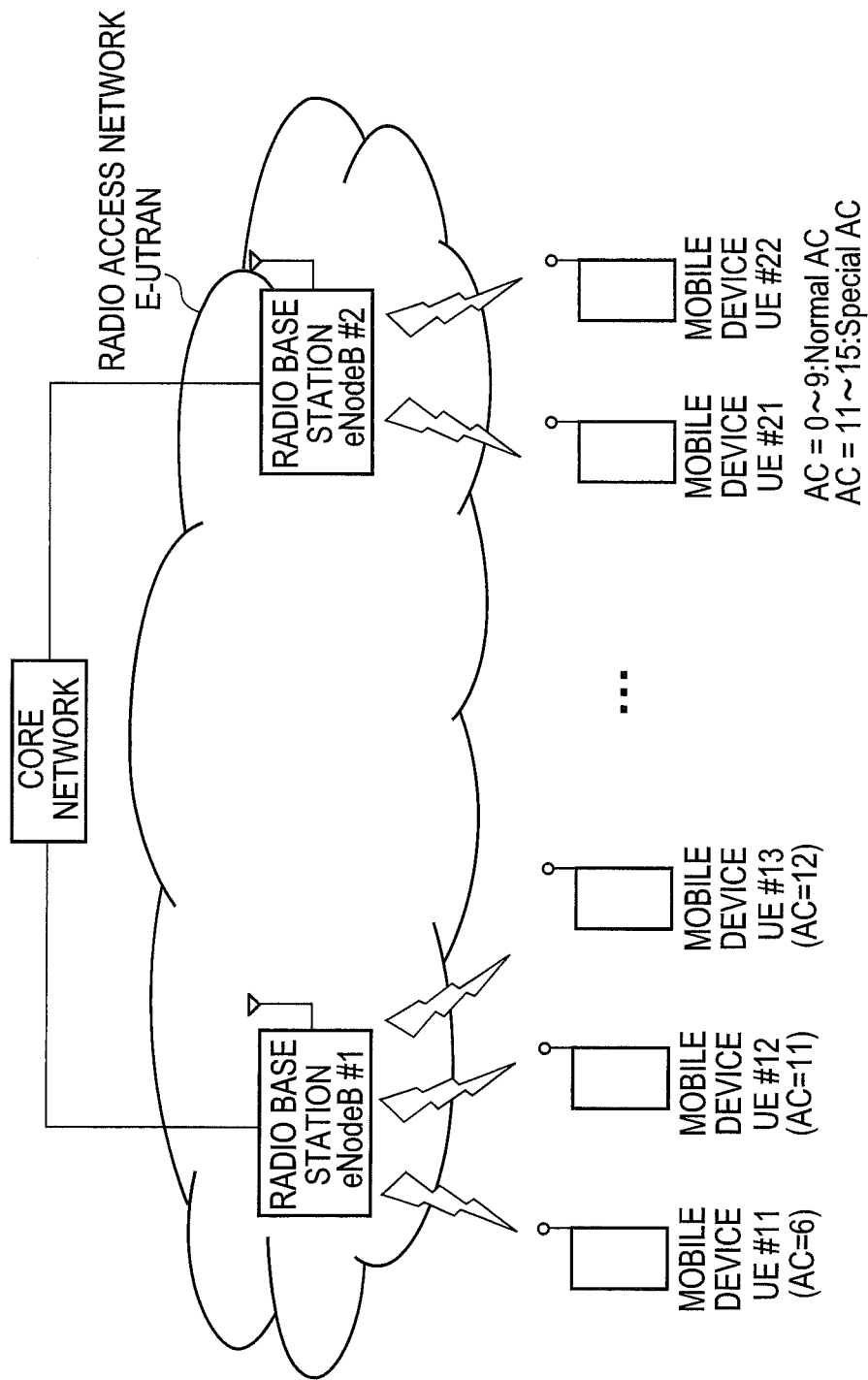
FIG. 1 is an overall configuration diagram of an example of a radio network system to which the present invention is applicable.

FIG. 1 is a diagram illustrating an overall configuration of a radio network system of an LTE system. The radio access network in the LTE system is called E-UTRAN, and is located between a core network and a mobile device user equipment (UE). The E-UTRAN is configured such that a plurality of eNodeBs that function as a radio base station and a radio network control device is arranged.

In the example of FIG. 1, normal type access classes (normal AC) are AC=0 to 9, special type access classes (special AC) are AC=11 to 15, a UE#11 belongs to AC=6 (normal), a UE#12 belongs to AC=11 (special: for operators), and a UE#13 belongs to AC=12 (special: for police services). The UE#12 and UE#13 may have AC=5 and 3 (normal) respectively, in addition to AC=11 and 12, for example. If they have special ACs, existence and a form of access barring can be determined regardless of which normal AC they belong to.

Figure 2:
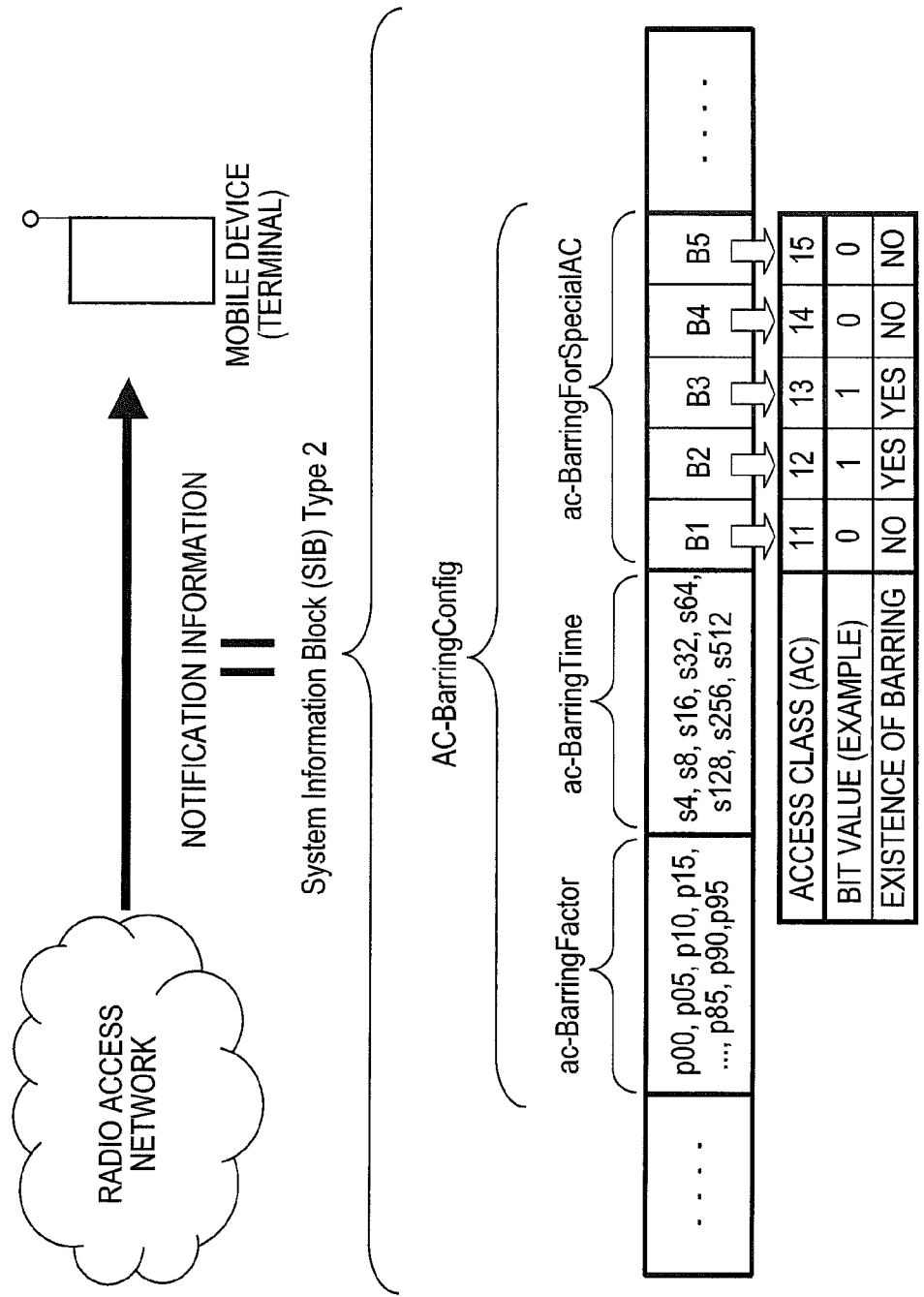
FIG. 2 is a diagram illustrating an example of information to be notified to a mobile device from a LTE-system radio access network.

Information notified from a UTRAN to a UE of FIG. 1 through a broadcast channel includes information called SIB2 as illustrated in FIG. 2, and further includes barring information called AC-BarringConfig therein. The inclusion of AC-BarringConfig can be understood that the radio access network is in a state of requiring some sort of access barring.

Figure 3:
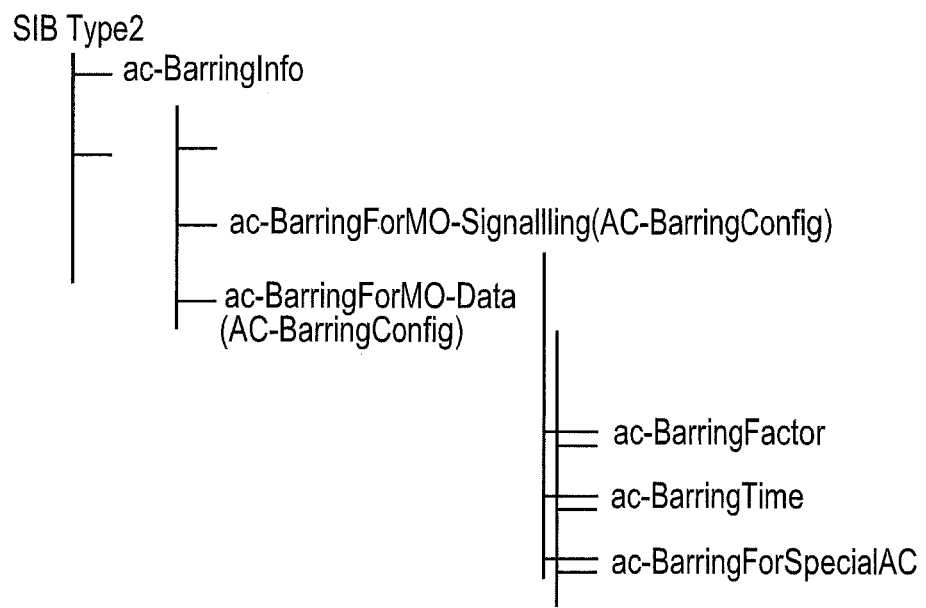
FIG. 3 is a diagram illustrating an example of a more detailed configuration of the information of FIG. 2.

To be specific, as illustrated in FIG. 3, an information element of ac-BarringInfo can be included in the SIB2, and any one of or both of ac-BarringForMO-Signalling (an information element referred to when RRC connection for signaling generated by a mobile device is set) and ac-BarringForMO-Data (an information element referred to when RRC connection for call generated by a mobile device is set) can be further included therein.

Both of the ac-BarringForMO-Signalling and the ac-BarringForMO-Data include the AC-BarringConfig. Therefore, when it is detected that the ac-BarringInfo and the ac-BarringForMO-Signalling, or the ac-BarringInfo and the ac-BarringForMO-Data are included in a mobile device that has received the SIB2, it can be determined that the barring information (AC-BarringConfig) is included.

A structure of the information of the AC-BarringConfig can be defined by ASN.1 (abstract syntax notation 1), and includes three elements: (1) ac-BarringFactor (an example of second barring information), (2) ac-BarringTime, and (3) ac-BarringForSpecialAC (an example of first barring information). These three elements are described in a sequence type (SEQUENCE), and are described in the order of (1), (2), and (3) because the order of appearance of the elements has importance.

The (1) is information for designating values at 5% intervals between 0 and 95%: p00, p05, p10, p15, p20, . . . , p85, p90, and p95. This information is described in an enumerated type (ENUMERATED). Therefore, first, the information is converted into a numerical value that serves as an object to be actually compared with a random number, and is then subjected to comparison processing with a random number described below.

The (2) is information for designating values of s4, s8, s16, s32, . . . , s256, and s512, and when setting of the RRC connection cannot be started due to access barring, the values serve as the basis to calculate numerical values to be set in a timer that determines how long the setting of the RRC connection is prohibited.

The (3) is a bit sequence, and is composed of five bits corresponding to AC=11 to 15. The bit value of each bit being 0 indicates there is no barring while the bit value being 1 indicates there is barring.

When a mobile device that has received the AC-BarringConfig decodes the information elements, processing of decoding content of necessary information element from among the (1), (2), and (3) can be performed by, for example, referring to a specification of the ASN.1.

Further, as for the information of the AC-BarringConfig, the eNodeB typically writes content in accordance with the degree of congestion of a network to be controlled by the eNodeB itself in the SIB2 to be put in a broadcast channel.

Figure 4:
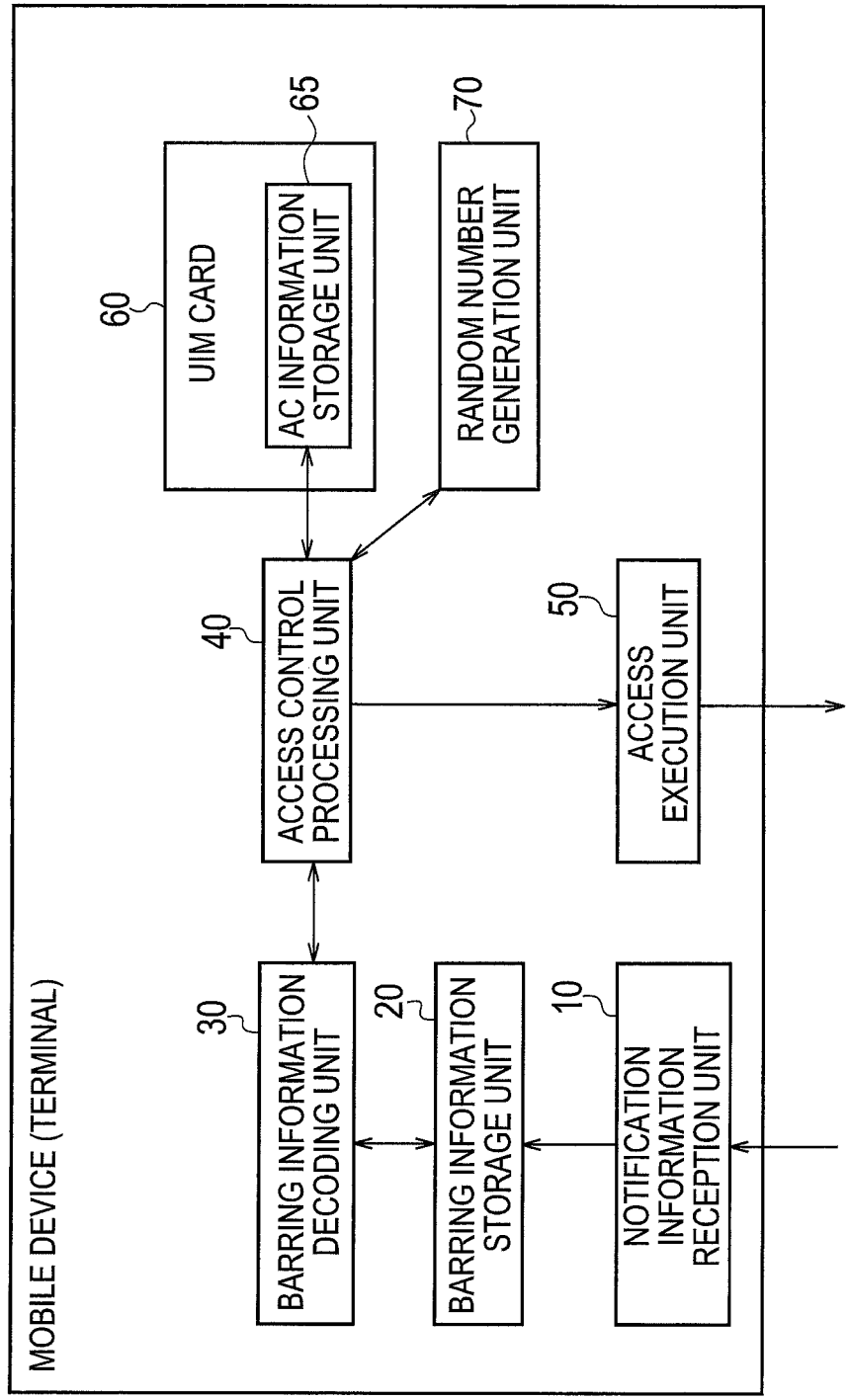
FIG. 4 is a block diagram illustrating an example of an internal configuration of a mobile device (terminal) in the present embodiment.
Figure 5:
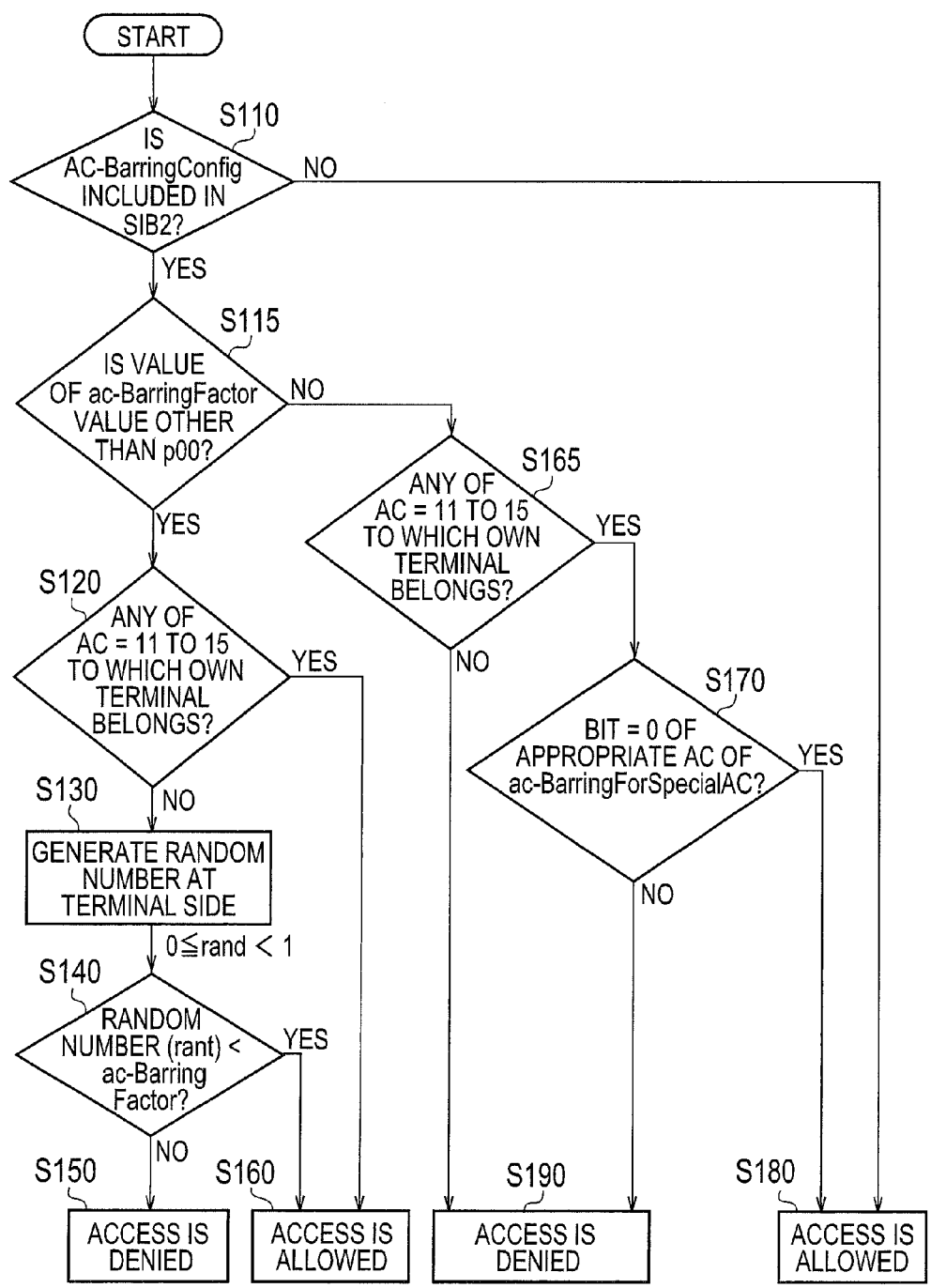
FIG. 5 is a flowchart illustrating an example of an operation of the mobile device (terminal) in the present embodiment.

An operation of a mobile device that has received the SIB2 notified as described above will be described with reference to the block diagram of FIG. 4 and the flowchart of FIG. 5.

When starting the setting of the RRC connection, first, the mobile device determines whether the SIB2 most recently received by a notification information reception unit 10 includes the AC-BarringConfig (S110). If the SIB2 does not include the AC-BarringConfig, the mobile device determines that an access is allowed (S180), and causes an access execution unit 50 to start a setting procedure of the RRC connection.

When the SIB2 includes the AC-BarringConfig, the AC-BarringConfig is stored in a barring information storage unit 20. Therefore, a barring information decoding unit 30 first decodes an ac-BarringFactor. This information is an element in a head of the AC-BarringConfig, and therefore, if checking with the ASN.1 specification is performed from the head in order, a result can be obtained without referring to other elements.

An access control processing unit 40 determines whether the decoded ac-BarringFactor is p00 (information indicating 0% in which it always indicates that an access is denied when being compared with a random number) (S115). When the decoded ac-BarringFactor is information other than p00, it can be understood that the radio access network desires access barring in which, regarding mobile devices having only the normal type ACs, a mobile device, an access of which is allowed, and a mobile device, an access of which is denied, appear at a desired rate, rather than the accesses of the mobile devices being determined either allowed or denied in a strict manner.

That is, when the decoded ac-BarringFactor is information other than p00 (i.e., p05 to p95), while an access of a certain mobile device may be denied by numerical values generated by the mobile devices, an access of another mobile device may be allowed. Therefore, the access control processing unit 40 checks whether any of AC=11 to 15 is stored as the AC to which the own device belongs by referring to an AC information storage unit 65 in a user identification module (UIM) card 60 (S120).

When the own device only have a normal type AC (any of AC=11 to 15 is not stored), the access control processing unit 40 instructs a random number generation unit 70 to generate a random number (pseudo random number and the like) of 0 to 1 (exclusive of 1) (S130). Then, the access control processing unit 40 converts the information of the ac-BarringFactor (here, information indicating p05 to p95) to be the numerical values of 5% to 95% to be actually compared with the random number, and checks magnitude relation between the numerical value and the generated random number (S140).

For example, when the ac-BarringFactor indicates p60 (designated with intent to allow an access of 60% and to deny an access of 40%) and the random number is 45%, the access control processing unit 40 determines that an access is allowed because of 45<60 (S160), and the access execution unit 50 starts the setting procedure of the RRC connection. In the same state, when the generated random number is 88%, the access control processing unit 40 determines that an access is denied because of 88>60 (S150).

When having determined that an access is denied, the access control processing unit 40 causes the barring information decoding unit 30 to decode information of subsequent ac-BarringTime stored in the barring information storage unit 20. Then, the access control processing unit 40 calculates a value to be set to the timer based on the information, and starts an operation from S110 again in order to start the setting of the RRC connection again as required when the timer is activated. When the access control processing unit 40 determines that an access is denied in the above-described flow, the information of the subsequent ac-BarringForSpecialAC is not needed to decode.

When the own device stores any of the special type ACs (AC=11 to 15), the access control processing unit 40 determines that an access is allowed (S160) and starts the setting procedure of the RRC connection by the access execution unit 50. In this case, the access control processing unit 40 determines that an access is allowed, and can reach the objective of the start of the RRC connection setting without causing the random number generation unit 70 to generate a random number, without performing processing of converting the information of the ac-BarringFactor into a numerical value to be compared, and further, without performing decoding processing of the subsequent barring information such as the ac-BarringTime and the ac-BarringForSpecialAC.

When the decoded ac-BarringFactor is p00, while an access of a certain mobile device may be denied by the numerical values generated by the mobile devices, an access of another mobile device cannot be allowed. Therefore, the access control processing unit 40 refers to the AC information storage unit 65 inside the UIM card 60, and checks whether any of AC=11 to 15 is stored as the AC to which the own device belongs (S165).

When the own device only has the normal type AC (any of AC=11 to 15 is not stored), the access control processing unit 40 determines that an access is denied (S190). Subsequent processing is as described above. When the access control processing unit 40 determines that an access is denied in this flow, the access control processing unit 40 can determine that an access is denied without decoding the information of the subsequent ac-BarringForSpecialAC, and further, without causing the random number generation unit 70 to generate a random number.

When the own device has any of the special type ACs (any of AC=11 to 15 is stored), the access control processing unit 40 causes the barring information decoding unit 30 to decode the information of the subsequent ac-BarringForSpecialAC stored in the barring information storage unit 20. Then, the access control processing unit 40 checks a value of a bit corresponding to the special type AC to which the own device belongs (AC=12 if it is the UE#13 in the example of FIG. 1, AC=12 is the second bit in the example of FIG. 2, and the second bit value is "1" in the example of FIG. 2) (S170).

When the bit value corresponding to the special type AC to which the own device belong is "1", the access control processing unit 40 determines that there is barring and an access is denied (S190). Following that, the access control processing unit 40 sets the timer using decoded ac-BarringTime if information of the ac-BarringTime has already been decoded, or decoded ac-BarringTime decoded by the barring information decoding unit 30 to determine a period to prohibit the setting of the RRC connection. In this case, even if the special type AC to which the own device belongs is designated to have barring in the ac-BarringForSpecialAC, the access control processing unit 40 can determine that an access is denied without causing the random number generation unit 70 to generate a random number.

Meanwhile, when the bit value corresponding to the special type AC to which the own device belongs is "0", the access control processing unit 40 determines that an access is allowed (S180) and starts the setting procedure of the RRC connection by the access execution unit 50.

Figure 6:
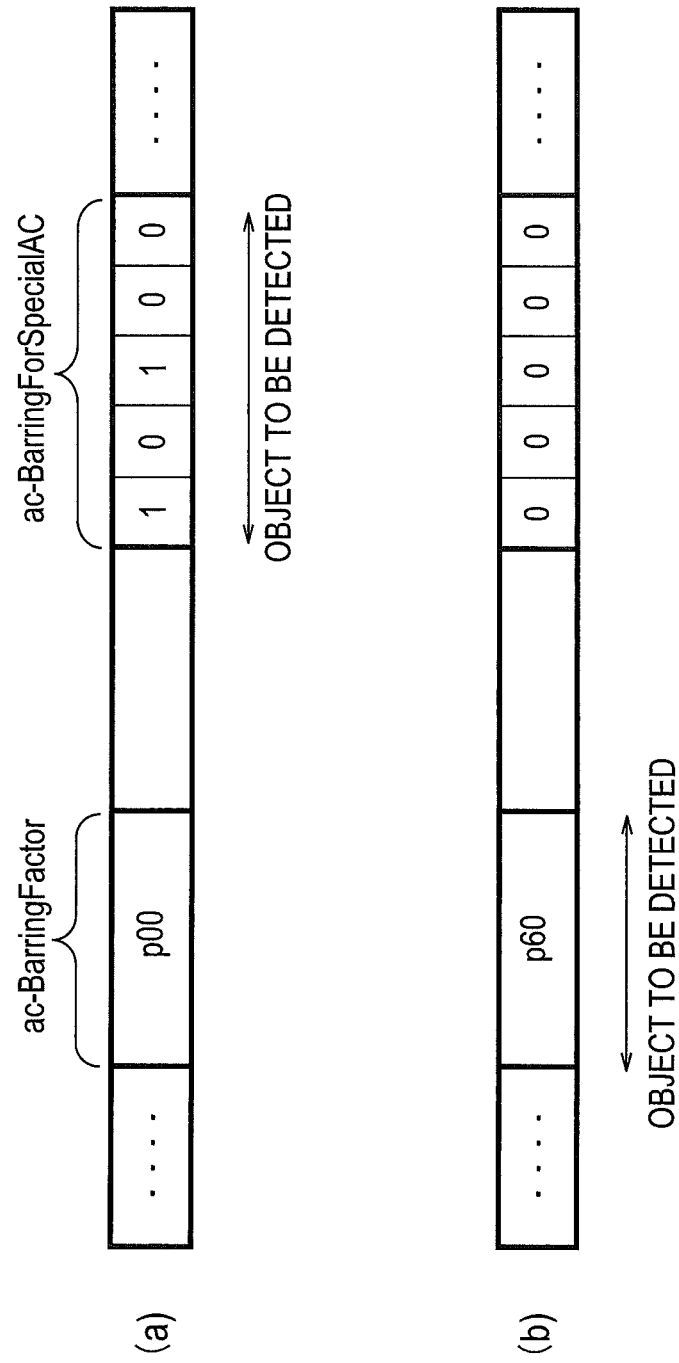
FIG. 6 is a diagram describing how the notification information of FIG. 2 is processed by the operation of the mobile device of FIG. 5.
Figure 7:
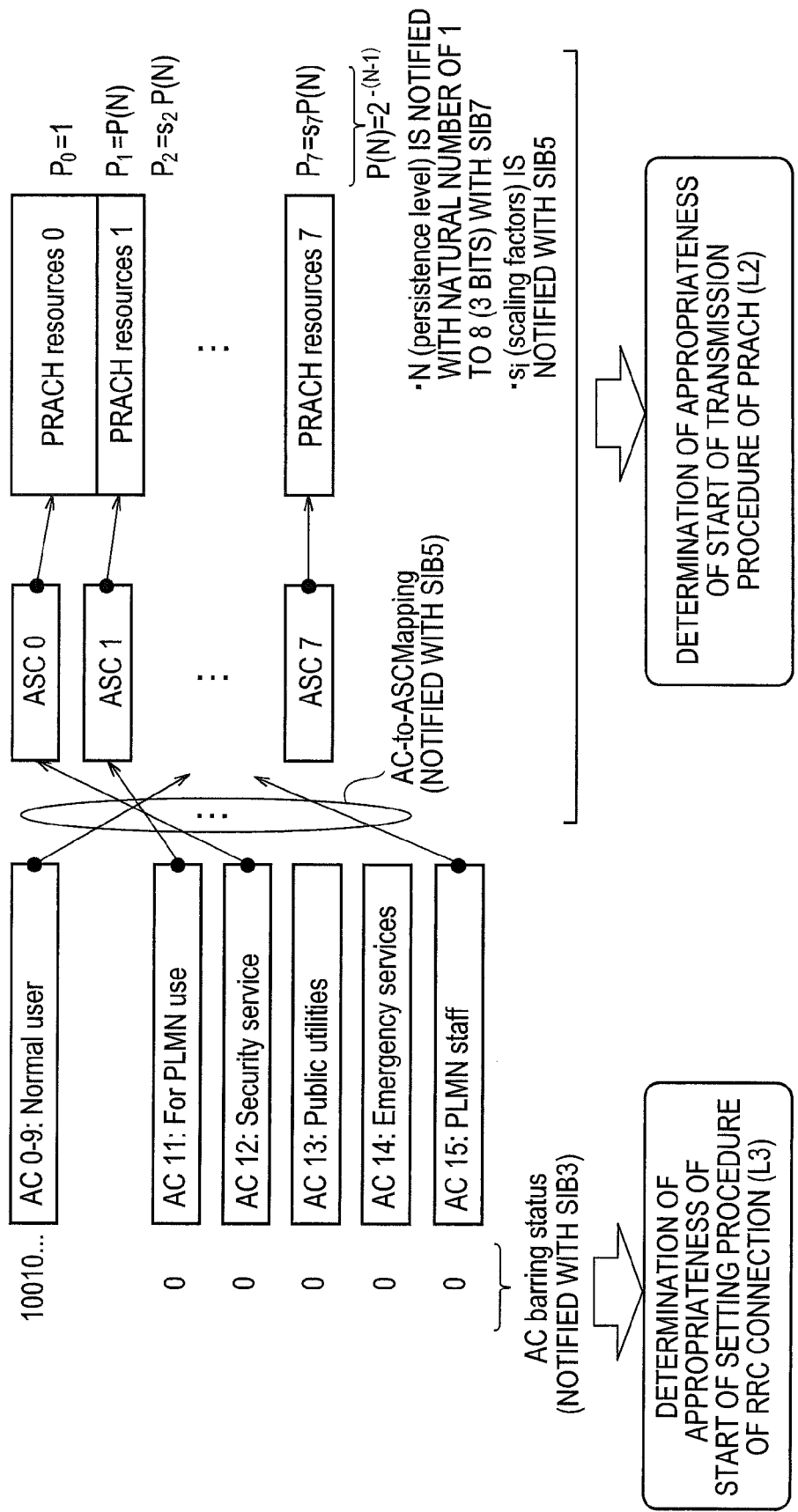
FIG. 7 is a diagram describing two-stage access barring in the W-CDMA.
Figure 8:
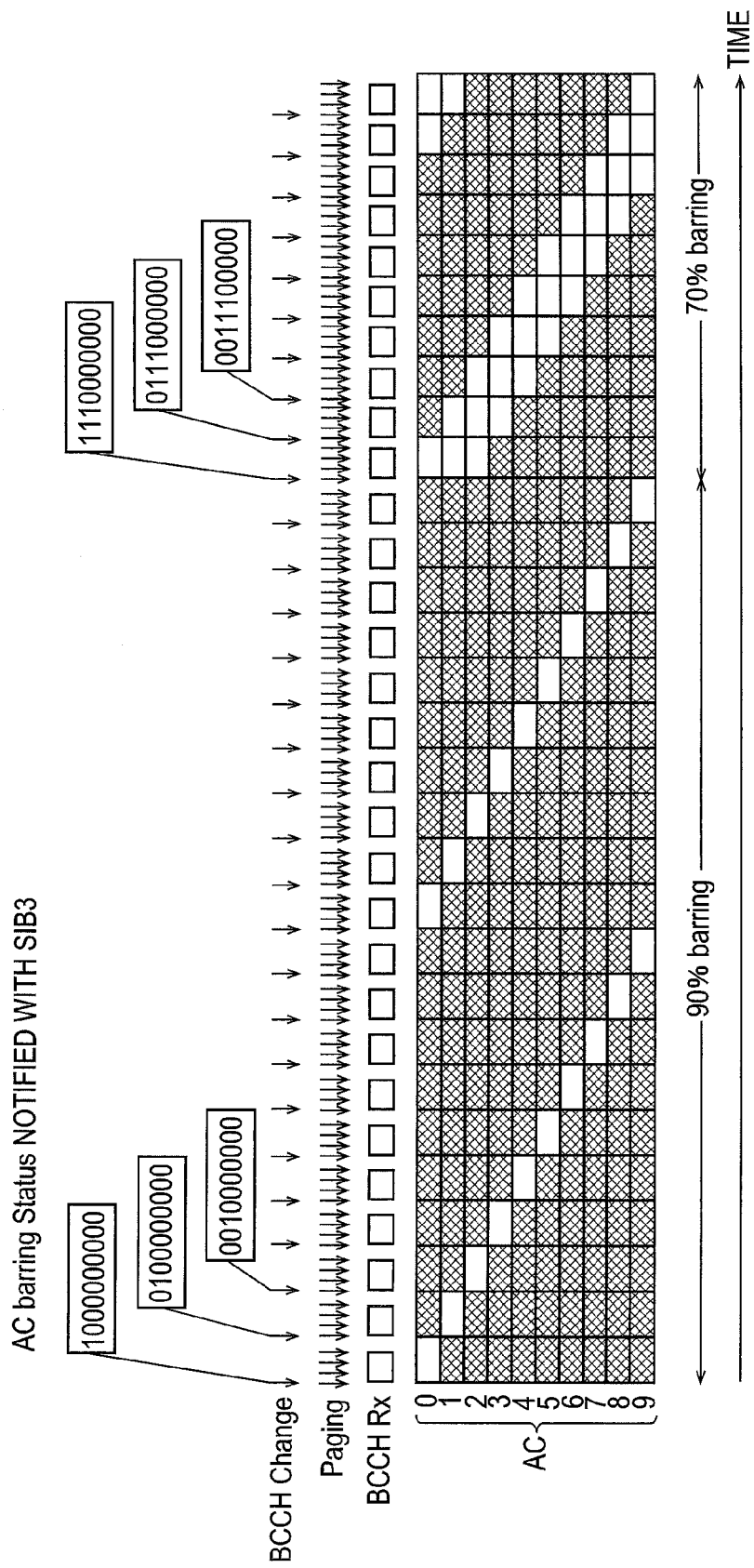
FIG. 8 is a diagram describing access barring in a L3 layer in the W-CDMA.
Figure 9:
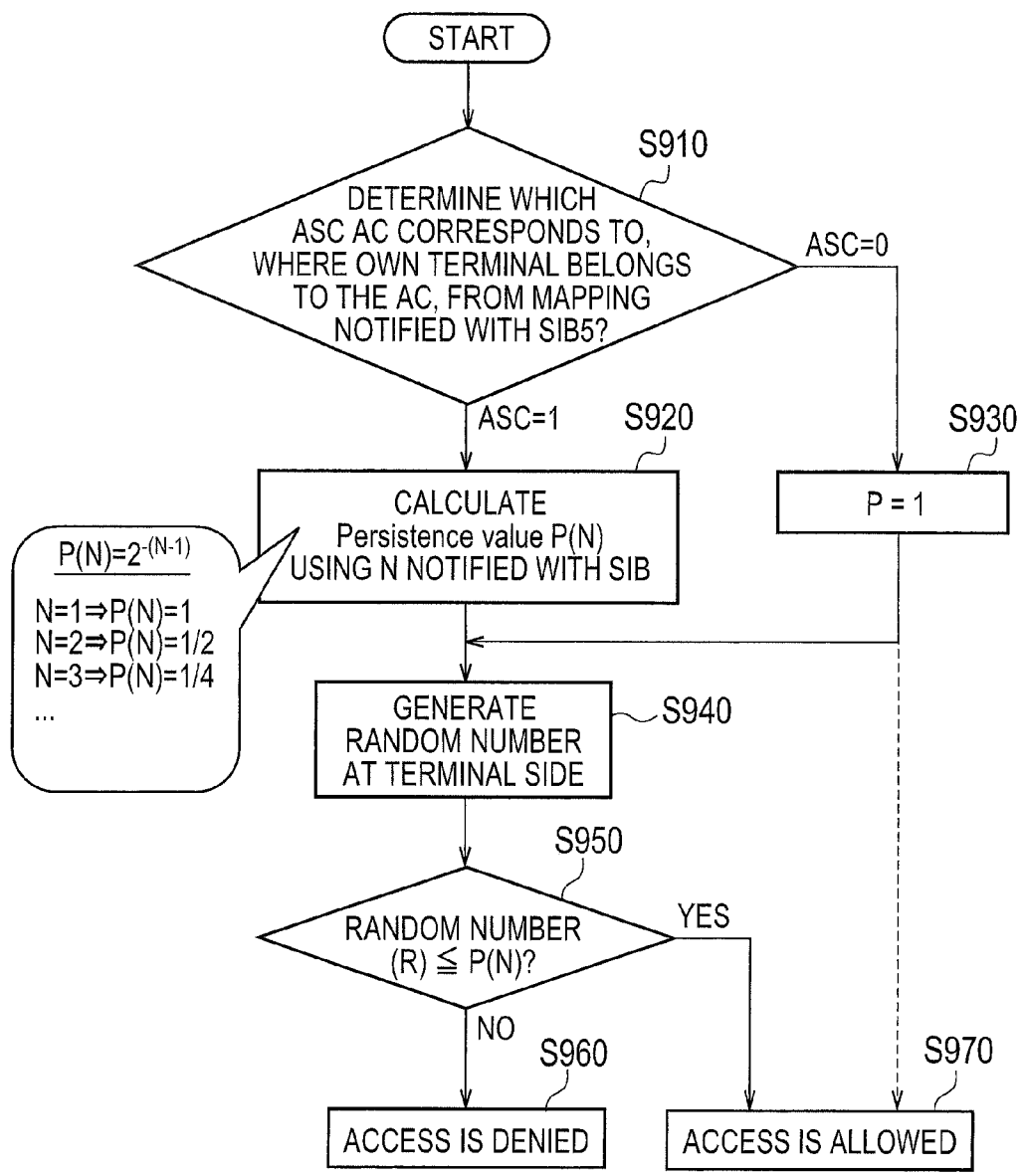
FIG. 9 is a diagram describing access barring in a L2 layer in the W-CDMA.

With the above-described operation of the mobile device, the SIB2 notified from the radio access network to the mobile device is handled as illustrated in FIG. 6.

FIG. 6(a) illustrates a case in which p00 is notified as the ac-BarringFactor, and the mobile device treats the ac-BarringForSpecialAC to be an object to be detected only in this case.

On the other hand, FIG. 6(b) illustrates a case in which information other than p00 is notified as the ac-BarringFactor, and in this case, the mobile device operates as if "0" (no barring) is designated to all of the bit sequences regardless of which bit sequence is set to the ac-BarringForSpecialAC in the actually notified SIB2.

That is, when the information other than p00 is notified, the mobile device determines an access is allowed or denied based on only the information of the ac-BarringFactor, and does not refer to the ac-BarringForSpecialAC.

Then, when the information other than p00 is notified, the mobile device determines that an access is allowed when having a special type AC, even if "1" is set to the ac-Barring-ForSpecialAC. Accordingly, the access barring such that the mobile device having a special type AC is always preferentially handled without being influenced by an operation or a malfunction of the radio access network can be realized.

While an embodiment of the present invention has been described above, it is apparent that a person skilled in the art can perform various modifications and applications of the above-described embodiment within the scope of the present invention.

REFERENCE SIGNS LIST

10 Notification information reception unit
20 Barring information storage unit
30 Barring information decoding unit
40 Access control processing unit
50 Access execution unit
60 UIM card
65 AC information storage unit
70 Random number generation unit

The invention claimed is:

1. A method of barring a network access performed in a mobile device connectable to a radio access network,
   each mobile device connectable to the radio access network belonging to at least one access class,
   a special type access class and a normal type access class existing in the access class,
   notification information to be notified to each mobile device from the radio access network including barring information for barring an access to the network, and
   the barring information including first barring information for designating whether a mobile device in each access class is subject to access barring, and second barring information indicating a value serving as a reference for determining appropriateness of an access according to a relationship with a numerical value generated by each mobile device,
   the mobile device
   determining whether the reference indicated by the second barring information has a possibility in which an access of a certain mobile device is denied while an access of another mobile device is allowed by a numerical value generated by each mobile device when establishing connection to the radio access network;
   when having determined to have the possibility, determining that an access is allowed when having the special type access class as an access class to which the mobile device itself belongs, and determining appropriateness of an access according to a relationship between a numerical value generated by the mobile device itself and the value serving as the reference when not having the special type access class as an access class to which the mobile device itself belongs; and
   when having determined not to have the possibility, determining the appropriateness of an access according to designation by the first barring information when having the special type access class as an access class to which the mobile device itself belongs, and determining that an access is denied when not having the special type access class as an access class to which the mobile device itself belongs.

2. The method of barring a network access according to claim 1, wherein, when the value serving as the reference is a value determined that an access is denied regardless of the numerical value generated by the mobile device, the reference indicated by the second barring information is determined not to have the possibility in which an access of a certain mobile device is denied while an access of another mobile device is allowed by the numerical value generated by each mobile device.

3. The method of barring a network access according to claim 2, wherein the value serving as the reference is determined based on a percentage of mobile devices, accesses of which are desired to allow in the network, and the numerical value generated by each mobile device is a number functioning as a random number.

4. The method of barring a network access according to claim 3, wherein the mobile device starts a setting procedure of radio resource control (RRC) connection to the network in accordance with the determination that an access is allowed.

5. The method of barring a network access according to claim 3, wherein the radio access network operates according to a long term evolution (LTE) system.

6. The method of barring a network access according to claim 2, wherein the mobile device starts a setting procedure of radio resource control (RRC) connection to the network in accordance with the determination that an access is allowed.

7. The method of barring a network access according to claim 6, wherein the radio access network operates according to a long term evolution (LTE) system.

8. The method of barring a network access according to claim 2, wherein the radio access network operates according to a long term evolution (LTE) system.

9. The method of barring a network access according to claim 1, wherein the value serving as the reference is determined based on a percentage of mobile devices, accesses of which are desired to allow in the network, and the numerical value generated by each mobile device is a number functioning as a random number.

10. The method of barring a network access according to claim 9, wherein the mobile device starts a setting procedure of radio resource control (RRC) connection to the network in accordance with the determination that an access is allowed.

11. The method of barring a network access according to claim 10, wherein the radio access network operates according to a long term evolution (LTE) system.

12. The method of barring a network access according to claim 9, wherein the radio access network operates according to a long term evolution (LTE) system.

13. The method of barring a network access according to claim 1, wherein the mobile device starts a setting procedure of radio resource control (RRC) connection to the network in accordance with the determination that an access is allowed.

14. The method of barring a network access according to claim 13, wherein the radio access network operates according to a long term evolution (LTE) system.

15. The method of barring a network access according to claim 1, wherein the radio access network operates according to a long term evolution (LTE) system.

16. A mobile device connectable to a radio access network,
   each mobile device connectable to the radio access network belonging to at least one access class, and
   a special type access class and a normal type access class existing in the access class,
   the mobile device comprising:
   a reception means configured to receive notification information notified from the radio access network;
   a storage means configured to take out from the notification information and store barring information for barring an access to the network, and including first barring information for designating whether a mobile device in each access class is subject to access barring, and second barring information indicating a value serving as a reference for determining appropriateness of an access according to a relationship with a numerical value generated by each mobile device;

a storing means configured to store information indicating at least one access class to which the mobile device itself belongs;

a generation means configured to select one from among a plurality of available numerical values every time generation of a numerical value is instructed, and to generate a value as a numerical value at the time of instruction; and a determination means configured to determine whether the reference indicated by the second barring information has a possibility in which an access of a certain mobile device is denied while an access of another mobile device is allowed by a numerical value generated by each mobile device, when having determined to have the possibility, to determine that an access is allowed when the information of the storing means indicates the special type access class is included, and to determine appropriateness of an access according to a relationship between the numerical value generated by the generation means and the value serving as the reference when the information of the storing means indicates the special type access class is not included, and when having determined not to have the possibility, to determine the appropriateness of an access according to designation by the first barring information when the information of the storing means indicates the special type access class is included, and to determine that an access is denied when the information of the storing means indicates the special type access class is not included.

17. The mobile device according to claim 16, further comprising a decoding means configured to decode the second barring information first from among the barring information stored by the storage means, and to decode the first barring information when the reference indicated by the second barring information is determined, by the determination means, not to have a possibility in which an access of a certain mobile device is denied while an access of another mobile device is allowed by the numerical value generated by each mobile device, and the information in the storing means indicates the special type access class is included.

18. The mobile device according to claim 17, wherein the generation means configured to generate the numerical value when the reference indicated by the second barring information is determined, by the determination means, to have a possibility in which an access of a certain mobile device is denied while an access of another mobile device is allowed by the numerical value generated by each mobile device, and the information in the storing means indicates the special type access class is not included.

19. The mobile device according to claim 16, wherein the generation means configured to generate the numerical value when the reference indicated by the second barring information is determined, by the determination means, to have a possibility in which an access of a certain mobile device is denied while an access of another mobile device is allowed by the numerical value generated by each mobile device, and the information in the storing means indicates the special type access class is not included.

20. A processor incorporated in and used by a mobile device,
   each mobile device connectable to the radio access network belonging to at least one access class,
   a special type access class and a normal type access class existing in the access class,
   notification information to be notified to each mobile device from the radio access network including barring information for barring an access to the network, and
   the barring information including first barring information for designating whether a mobile device in each access class is subject to access barring, and second barring information indicating a value serving as a reference for determining appropriateness of an access according to a relationship with a numerical value generated by each mobile device,
   the processor performing operations of:
   determining whether the reference indicated by the second barring information has a possibility in which an access of a certain mobile device is denied while an access of another mobile device is allowed by a numerical value generated by each mobile device when establishing connection to the radio access network;
   when having determined to have the possibility, determining that an access is allowed when the mobile device has the special type access class as an access class to which the mobile device itself belongs, and determining appropriateness of an access according to a relationship between a numerical value generated by the mobile device itself and the value serving as the reference when the mobile device does not have the special type access class as an access class to which the mobile device itself belongs; and
   when having determined not to have the possibility, determining the appropriateness of the access according to designation by the first barring information when the mobile device has the special type access class as an access class to which the mobile device itself belongs, and determining that the access is denied when the mobile device does not have the special type access class as an access class to which the mobile device itself belongs.

* * * * *